United States Patent [19]

Purtell

[11] 3,838,599
[45] Oct. 1, 1974

[54] FLOW METER
[75] Inventor: Rufus J. Purtell, Brownfield, Tex.
[73] Assignee: Tri-Matic, Inc., Brownfield, Tex.
[22] Filed: Feb. 5, 1973
[21] Appl. No.: 329,853

Related U.S. Application Data
[63] Continuation-in-part of Ser. No. 314,829, Dec. 13, 1972, abandoned.

[52] U.S. Cl. ............................................. 73/211
[51] Int. Cl. ........................................... G01f 1/00
[58] Field of Search ............ 73/205, 211, 213, 401; 138/44

[56] References Cited
UNITED STATES PATENTS
3,600,945  8/1971  Wenzel .............................. 73/211

Primary Examiner—Charles A. Ruehl
Attorney, Agent, or Firm—Wendell Coffee

[57] ABSTRACT

A flow meter for irrigation water uses an inverted U-tube with an upstream leg which drains into the pipe upstream of an orifice and a downstream leg which drains into a tank and the tank drains into the pipe downstream of the orifice. The tank has sufficient volume to trap sufficient air so the differential pressure is always measured from the tank to the water level in the upstream leg. All of the water in the system drains into the pipe to prevent freezing in cold weather and to catch a fresh charge of air into the U-tube. A ball floats to indicate the top of the water and a valve seat in the bight prevents bouncing the ball or water over the top. Air pumped in the water is captured in the U-tube and drives out the water in the tank.

16 Claims, 3 Drawing Figures

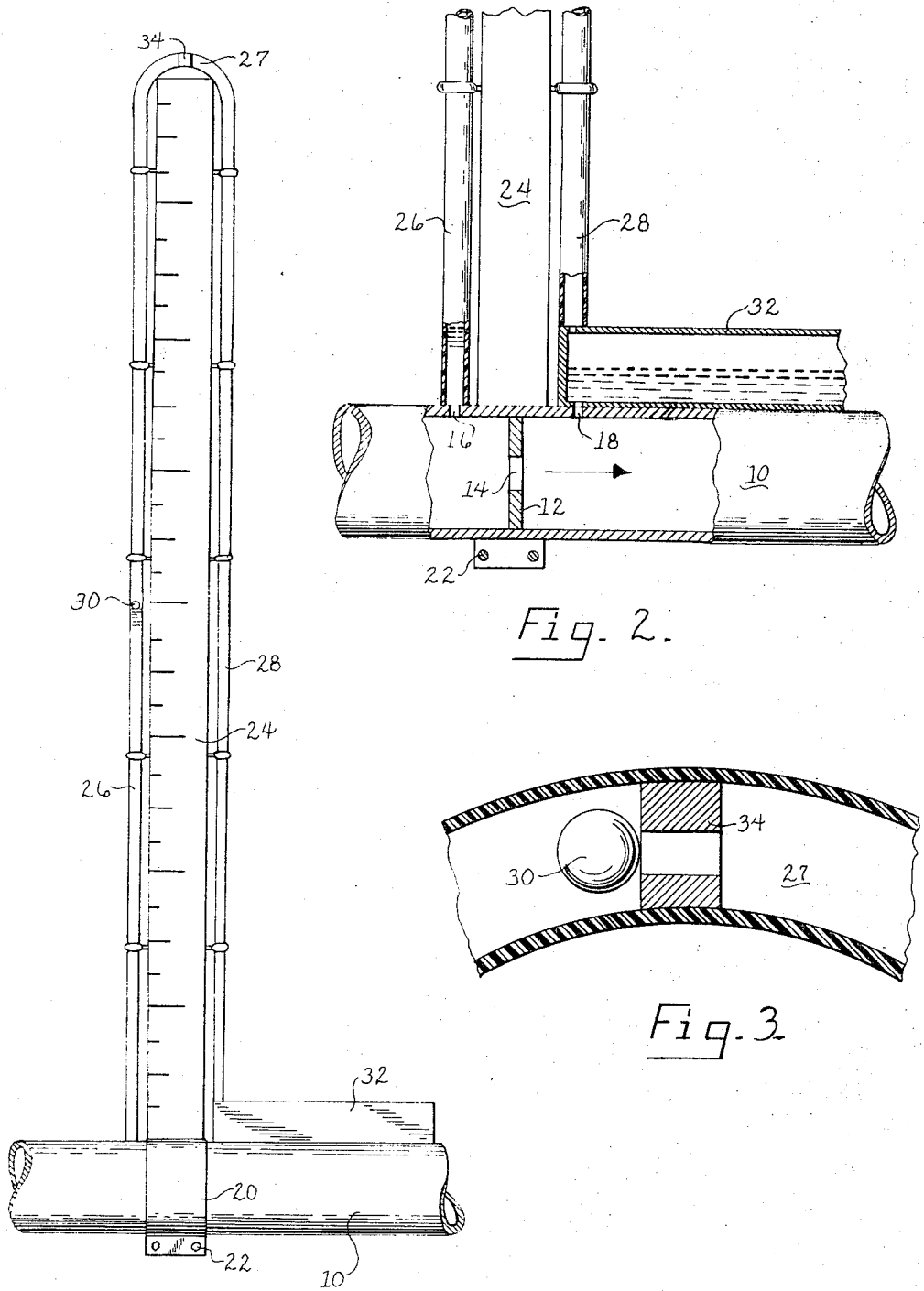

FLOW METER

CROSS-REFERENCE TO RELATED APPLICATIONS

This is a continuation-in-part of my prior filed patent application of the same title, Ser. No. 314,829, filed Dec. 13, 1972, now abandoned.

BACKGROUND OF THE INVENTION

1. Field of the Invention

This invention relates to a pressure differential orifice-type rate of flow meter. (73/211)

2. Description of the Prior Art

At the present time, agricultural irrigation is a major endeavor in the United States. It is often desirable to know the flow of water through a pipe. Commercially on the market, there are available propeller-type flow meters.

Although U-tubes with orifices are a common type flow measuring device, they are not commercially used for irrigation purposes.

U.S. Patents considered in the preparation of this application include:
No. 1,540,533;
No. 1,622,248;
No. 2,009,427;
No. 2,297,408;
No. 2,306,941.

SUMMARY OF THE INVENTION

1. New and Different Function

This invention provides a simple, direct reading, inverted U-tube type flow meter. The upstream leg of the U-tube is connected directly into the pipe upstream of the orifice and the tube in the form of a plastic tube extends over a post attached as by a collar to the pipe. The downstream leg of the U-tube connects to a tank. The tank has sufficient volume so the air trapped in the tank prevents water from overflowing the tank. Therefore, the difference in pressure is always measured from the tank to the water level in the upstream leg of the tube. Although the water level in the tank will vary slightly because of the water pressure in the pipe or the amount of trapped air which has been absorbed by the water, the difference does not materially affect reading.

Normally, air will be pumped with the water and be present in the irrigation water. It will be trapped by the orifice plate and, primarily, escape as bubbles into the upstream leg. The frequency of the bubbles will give the operator information about the amount of air being pumped by his well. Also, this, which comes into the U-tube, will drive the water out of the tank so that the tank is substantially free of water. Therefore, the pressure differential will be indicated by distance from the top of the pipe to the level of water in the upstream leg of the U-tube.

All of the water drains back into the pipe so there is no danger of bursting or damaging parts of the system due to freezing. Also, at each weekly shutdown, a new supply of fresh air is trapped within the tube.

2. Objects of this Invention

An object of this invention is to measure water flow in irrigation pipes.

Another object is to indicate the amount of air pumped with the irrigation water.

Other objects are to achieve the above with a device that is sturdy, durable, lightweight, simple, safe, efficient, versatile, and reliable, yet inexpensive and easy to manufacture, install, read, and maintain.

Further objects are to achieve the above with a method that is versatile, rapid, efficient, and inexpensive, and does not require skilled people to install, calibrate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a side elevational view of an embodiment of this invention.

FIG. 2 is a partial side elevational view with parts broken away to better illustrate the invention.

FIG. 3 is a longitudinal sectional view of the bight of the tube.

DESCRIPTION OF THE PREFERRED EMBODIMENT

Referring more specifically to the drawing, there is illustrated pipe 10 representing a common irrigation pipe carrying irrigation water. It will be understood by those skilled in the art that this would commonly be about 6 inches or 8 inches in diameter.

Orifice plate 12 is placed within the pipe with an orifice 14 therethrough. Upstream opening 16 and downstream opening 18 in the pipe provide openings for the measurement of the pressure upstream and downstream of the orifice plate 12.

Generally, the description to this point of the orifice plate with the openings 16 and 18 is well known to the measuring arts. Standard tables are well known and conveniently available to anyone skilled in the art by which, in relationship to the size of the orifice 14, the rate of flow in the pipe can be readily determined from the differential pressure between the upstream opening 16 and the downstream opening 18. Also, these standard calibrated charts indicate the placement of the upstream and downstream openings. I.e., how far each are from the orifice plate 12.

I clamp band 20 around the pipe 10, securing it firmly in place by bolts 22. Post 24 is rigidly attached to the top of this band. The height of the post is so the water level within upstream leg 26 of the tube does not reach the top. I.e., after determining the size of the orifice 14 in the orifice plate 12 and the expected flow of water, it will be known how high the water will rise in the upstream leg 26. Normally, it will be designed so the post is about 8 to 10 feet tall. The tube loops over the top of the post 24 to form downstream leg 28 on the other side of the post. The upstream leg 26 and downstream leg 28 are held in place adjacent to the post 24, preferably by eye-bolts. Any means of attachment is satisfactory. E.g., it would be tape or wire binding. It will be well within the skill of those in the art to place either directly or upon a plate to be attached to the post 24 a scale indicating the flow of water. The more common rates of water flow would be either acre feet per day or gallons per minute. However, the standard tables to make such calibrations are readily available.

The tube forming the legs 26 and 28 is any transparent, flexible tube. This is commonly available as plastic tubing. I prefer to use small, floating ball 30 in the upstream leg 26 so the height of the water within the tube is readily apparent. The diameter of the tube is of no major consequence except for the fact that the volume of air to be contained in the tube determines the size of tank 32, as will be explained later.

The tank 32 is connected on top of the pipe 10 on the downstream side from the orifice plate 12. The bottom of the tank 32 is fluidly connected to the downstream opening 18 which is in the top of the pipe 10. The bottom of the downstream leg 28 is fluidly connected to the top of the tank 32. The bottom of the upstream leg 26 is fluidly connected to the upstream opening 16.

In operation, the flow of water through the pipe 10, as indicated by the arrow in FIG. 2, will cause a pressure differential so the pressure on the upstream opening 16 is greater than the pressure upon the downstream opening 18. Also, there will be pressure in the pipe 10. E.g., if the gauge pressure upon the pipe 10 is approximately 60 psig, the absolute pressure upon the pipe will be approximately 75 psig. The differential pressure in an 8 inch pipe with a 5 inch orifice 14 flowing 540 gallons per minute will be sufficient so the water will rise in the upstream leg 30 inches higher than the downstream leg. Therefore, with the figures given above, if the volume of the tank 32 is at least five times greater than the volume of the tube forming the upstream and downstream legs 26 and 28, the air trapped within the tank 32 and the upstream and downstream leg 28 will be sufficiently compressed so the water remains in the tank 32 and does not enter the downstream leg 28.

It will be understood that there is usually some slight amount of air with the water. Referring to FIG. 2, there may be seen that this air normally will be trapped before the orifice plate 12 and enter through the upstream opening 16 into the upstream leg 26. There the air will be visible as it travels up the tube 26 and will cause the ball 30 to jump. This will give the operator a visual indication of how much air is being pumped by his equipment.

Also, it will add air to the U-tube and the tank and will normally drive all of the water from the tank 32 so the tank 32 is substantially dry. Therefore, the differential pressure can be measured from the top of the inside of the pipe 10. Inasmuch as these pipes are quite thin walled, the measurement can be from the top of the outside of the pipe. Even if the reading is taken shortly after the well has been started and all the water has not been driven from the tank 32, there is sufficient accuracy for the purposes intended.

Generally, for accuracy purposes by which these meters are taken, a difference of one inch will be only about 8 gallons per minute for the example given above, and, therefore, this is well within the tolerance.

Therefore, if the tank 32 is at least five times greater than the volume within the tubes, this will accommodate a pressure up to about 60 psig in the pipes. However, since a small tube is just as good as a large tube and the tanks are inexpensive, I prefer to use a tank 32 that has 10 times the volume of the tubes 26 and 28. This will provide for a pressure within the pipe that is 10 times atmospheric pressure or about 140 psig.

The upstream hole opening 16 can be made extremely small and this will choke or restrict the flow of liquids to prevent any "bouncing" of the liquid level within the upstream leg 26. Of course, this same effect can be achieved by using a small diameter tube.

It will be known to those skilled in the art that the water flowing in the pipe 10 will be relatively warm in subfreezing weather. I.e., even if the atmospheric temperature is well below freezing, the water in the pipe 10 will be well above freezing. Therefore, since the tank 32 is in contact with the pipe 10, the downstream opening 18 will not freeze even if the water in the top of the tank 32 is frozen. Also, the water immediately adjacent to the opening 16 will not freeze even if the water in the tube 26 freezes. Those skilled in the art will realize that water freezing in a flexible pipe will cause no damage and, normally, water freezing in a tank, so long as the water is not confined within the tank, will not do any harm since the elasticity of the walls of the tank are sufficient to accommodate the freezing of the water. Stated otherwise, there is no possibility of damage to the system due to freezing. If the wells are shut down when the water is warm, all of the water will drain out of the tubes and tanks into the pipe. If the water is shut down when it is freezing, although ice may remain in the tube 26 and the upper portion of the tank 32, the water in the lower part of the tank will drain back into the pipe 10 and cause no difficulty.

A ball stop or valve seat 34 is placed in the bight 27 of the U-tube with legs 26 and 28; therefore, when water is first pumped into the system or in abnormal operation, the ball will not be bounced into the downstream leg 28. Also, the ball will act as a valve to prevent water flowing over the top.

Therefore, it may be seen that I have provided a simple, safe, efficient way in which to measure the flow of water in the pipe 10.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. An indicator of the relative quantity of the flow of water in a pipe comprising:
   a. an orifice plate in the pipe,
   b. a post attached to the pipe at the orifice and extending vertically upward therefrom,
   c. an inverted U-shaped transparent tube attached to the post, said tube having
      i. an upstream leg and
      ii. a downstream leg,
   d. a tank attached to the top of the pipe,
   e. the tank having a volume greater than the volume of the tube,
   f. the bottom of the upstream leg of the tube fluidly connected to the top of the pipe upstream of the orifice plate so the water in the upstream leg drains into the pipe,
   g. the bottom of the downstream leg of the tube fluidly connected to the top of the tank so water in the downstream leg drains into the tank, and h. the bottom of the tank fluidly connected to the top of the pipe downstream of the orifice plate so water in the tank drains into the pipe.

2. The invention as defined in claim 1 with an additional limitation of
  j. a choke at the bottom of the upstream leg to prevent the water from surging into the tube.

3. The invention as defined in claim 1 with additional limitations of
  j. said tank in thermal conductive contact with said pipe, and
  k. having a volume of at least five times greater than the volume of the tube.

4. The invention as defined in claim 1 with an additional limitation of
  j. said tank having a volume of at least ten times greater than the volume of the tube.

5. The invention as defined in claim 1 with an additional limitation of
  j. a ball having density less than water in the upstream leg.

6. The invention as defined in claim 5 with an additional limitation of
  k. an annular ball stop in the bight of the U-shaped tube.

7. The invention as defined in claim 6 with an additional limitation of
  m. said tank having a volume of at least 10 times greater than the volume of the tube.

8. The invention as defined in claim 7 with an additional limitation of
  n. said tank in thermal conductive contact with said pipe.

9. The invention as defined in claim 8 with an additional limitation of
  o. a choke at the bottom of the upstream leg to prevent the water from surging into the tube.

10. The method of measuring the flow of water in a pipe comprising:
  a. restricting the flow of water in the pipe by an orifice of known size,
  b. flowing water from the pipe into an upstream leg of an inverted U-tube differential pressure meter responsive to water flow and water pressure in the pipe,
  c. flowing water from the pipe into a tank downstream of the orifice responsive to water pressure in the pipe,
  d. trapping sufficient air in the top of the tank and a connected downstream leg of the U-tube differential pressure meter, thus
  e. preventing any water flow into the downstream leg of the U-tube, thereby
  f. equalizing the air pressure in the upstream leg of the U-tube and the downstream leg of the U-tube and the top of the tank, thus,
  g. indicating by the height of the water in the upstream leg the differential pressure across the orifice and, thereby,
  h. indicating the rate of flow of water in the pipe.

11. The invention as defined in claim 10 with an additional limitation of
  j. choking the flow of water into the upstream leg to prevent surging.

12. The invention as defined in claim 10 with an additional limitation of
  j. flowing any air in the pipe into the upstream leg, thereby
    i. furnishing a visual indication of the amount of air pumped by the system, and further
    ii. driving the water from the tank.

13. The invention as defined in claim 10 with an additional limitation of
  j. floating a ball on the top of the water of the upstream leg.

14. The invention as defined in claim 13 with additional limitations of
  k. stopping the ball at the bight of the U-tube, and
  m. stopping fluid flow at the bight responsive to stopping the ball.

15. The invention as defined in claim 14 with an additional limitation of
  n. choking the flow of water into the upstream leg to prevent surging.

16. The invention as defined in claim 15 with an additional limitation of
  o. flowing any air in the pipe into the upstream leg, thereby
    i. furnishing a visual indication of the amount of air pumped by the system, and further
    ii. driving the water from the tank.

* * * * *